(12) United States Patent
Lessmann et al.

(10) Patent No.: US 9,862,318 B2
(45) Date of Patent: Jan. 9, 2018

(54) METHOD TO DETERMINE DISTANCE OF AN OBJECT FROM AN AUTOMATED VEHICLE WITH A MONOCULAR DEVICE

(71) Applicant: Delphi Technologies, Inc., Troy, MI (US)

(72) Inventors: Stephanie Lessmann, Wuppertal (DE); Mirko Meuter, Erkath (DE); Dennis Mueller, Moers (DE)

(73) Assignee: DELPHI TECHNOLOGIES, INC., Troy, MI (US)

( * ) Notice: Subject to any disclaimer, the term of this patent is extended or adjusted under 35 U.S.C. 154(b) by 39 days.

(21) Appl. No.: 14/953,848

(22) Filed: Nov. 30, 2015

(65) Prior Publication Data

US 2016/0180531 A1  Jun. 23, 2016

(30) Foreign Application Priority Data

Dec. 22, 2014  (EP) .................................. 14199767

(51) Int. Cl.
*G06K 9/00* (2006.01)
*B60R 1/00* (2006.01)
(Continued)

(52) U.S. Cl.
CPC ............ *B60R 1/00* (2013.01); *G06K 9/00805* (2013.01); *G06K 9/3241* (2013.01);
(Continued)

(58) Field of Classification Search
None
See application file for complete search history.

(56) References Cited

U.S. PATENT DOCUMENTS 5,867,256 A * 2/1999 Van Rheeden ......... G01S 11/12
356/4.03
6,765,480 B2 * 7/2004 Tseng ................. G06K 9/00805
340/425.5

(Continued)

FOREIGN PATENT DOCUMENTS

DE  10 2010 015532 A1  11/2010
EP      2 562 681 A1   2/2013
WO     2013/081984 A1   6/2013

OTHER PUBLICATIONS

J Chun Lao, et al.: "Hit Me If You Can", Cornell University Course CS4758/6758: Robot Learning, May 16, 2012, pp. 1-8.

*Primary Examiner* — Avinash Yentrapati
(74) *Attorney, Agent, or Firm* — Lawrence D. Hazelton

(57) ABSTRACT

A method of determining the distance of an object from an automated vehicle based on images taken by a monocular image acquiring device. The object is recognized with an object-class by means of an image processing system. Respective position data are determined from the images using a pinhole camera model based on the object-class. Position data indicating in world coordinates the position of a reference point of the object with respect to the plane of the road is used with a scaling factor of the pinhole camera model estimated by means of a Bayes estimator using the position data as observations and under the assumption that the reference point of the object is located on the plane of the road with a predefined probability. The distance of the object from the automated vehicle is calculated from the estimated scaling factor using the pinhole camera model.

11 Claims, 3 Drawing Sheets

(51) Int. Cl.
*H04N 5/225* (2006.01)
*G06K 9/32* (2006.01)
*G06K 9/62* (2006.01)
*G06T 7/73* (2017.01)
*G06T 7/246* (2017.01)

(52) U.S. Cl.
CPC ............ *G06K 9/6278* (2013.01); *G06T 7/246* (2017.01); *G06T 7/73* (2017.01); *H04N 5/225* (2013.01); *B60R 2300/804* (2013.01); *B60R 2300/8033* (2013.01)

(56) References Cited

U.S. PATENT DOCUMENTS

| | | | |
|---|---|---|---|
| 8,848,978 B2* | 9/2014 | Yankun | G06K 9/00805 382/103 |
| 9,171,217 B2* | 10/2015 | Pawlicki | G06T 7/13 |
| 2004/0016870 A1* | 1/2004 | Pawlicki | G06T 7/13 250/208.1 |
| 2005/0232466 A1* | 10/2005 | Kampchen | G06T 7/269 382/103 |
| 2007/0154068 A1* | 7/2007 | Stein | G01C 3/22 382/106 |
| 2008/0219501 A1* | 9/2008 | Matsumoto | G06T 7/251 382/103 |
| 2008/0304707 A1* | 12/2008 | Oi | G06K 9/00664 382/103 |
| 2013/0188019 A1* | 7/2013 | Christopher | H04N 13/0235 348/46 |
| 2014/0037138 A1* | 2/2014 | Sato | G08G 1/166 382/103 |
| 2014/0168378 A1* | 6/2014 | Hall | H04N 13/0246 348/47 |
| 2014/0176350 A1 | 6/2014 | Niehsen et al. | |
| 2014/0204212 A1* | 7/2014 | Pawlicki | G06T 7/73 348/148 |
| 2017/0024889 A1* | 1/2017 | Brown | G06K 9/46 |

* cited by examiner $$\alpha_i^t = \arctan\left(\frac{\frac{x_w^t}{p_i} + C_{14}}{\frac{z_w^t}{p_i} + C_{34}}\right)$$

$$d = \left\|\frac{1}{p}\cdot\begin{pmatrix}\tilde{x}_w \\ \tilde{y}_w \\ \tilde{z}_w\end{pmatrix} + C_4^{-1}\right\|_2$$

$$P(c_c|p_i) = \sum_{c_{gt}} P(c_c, c_{gt}|p_i)$$

$$p = \arg\max_{p_i}(P(p_i|\overline{\alpha}_i, c_c))$$

Fig. 3

METHOD TO DETERMINE DISTANCE OF AN OBJECT FROM AN AUTOMATED VEHICLE WITH A MONOCULAR DEVICE

CROSS-REFERENCE TO RELATED APPLICATION

This application claims the benefit under 35 U.S.C. §119 (a) of European Patent Application EP 14199767.6, filed Dec. 22, 2014, the entire disclosure of which is hereby incorporated herein by reference.

TECHNICAL FIELD OF INVENTION

This disclosure generally relates to a method of determining the distance of an object from a automated vehicle using a monocular image capturing device (i.e. a monocular device) located on an automated vehicle at a height above a road over which the automated vehicle travels, where images of the environment about the automated vehicle are taken at time intervals, the object is recognized in the taken images, and is associated with an object-class an image processing system.

BACKGROUND OF INVENTION

Image-based object recognition processes are of importance for various driver-assistance systems in automated vehicles (e.g. partially automated or fully automated, i.e. autonomous) such as for lane-changing assistants, distance control systems, or pedestrian protection systems. A monocular image capturing device is a camera equipped with a single objective-lens that is fastened to the automated vehicle and which, for example, takes images of the traffic space in front of the automated vehicle. The automated vehicle which is equipped with the camera may also be referred to as a "host-vehicle". Computer-assisted image processing systems are able to identify objects of interest such as road markings, traffic signs, pedestrians, and other vehicles with relatively high reliability in such camera images and optionally to track them by means of a tracking process.

A reliable estimate of the absolute distances to objects from the automated vehicle is desirable for safety-relevant systems in order to avoid collisions. Images taken or captured by monocular image capturing devices do not inherently contain reliably extractable depth information so that the determination of distance to an object is difficult when using only a monocular image capturing device. It has been suggested that an image processing system could derive the desired depth information from a priori information, for example by presuming that an object has a known width. It is, however, understood that such presumptions are frequently not met or are not met exactly enough in practice and that unacceptable errors can thereby enter into the associated calculation. Conventional processes for distance determination by means of a monocular image capturing device using a priori information are generally not suitable for safety-critical applications such as autonomous driving. The use of stereo cameras is a known means to determine distance, but is undesirable for cost reasons.

SUMMARY OF THE INVENTION

Described herein is a system and method of determining the distance of an object from an automated vehicle that can be carried out by using exclusively a monocular image capturing device as the measuring apparatus. The method includes equipping an automated vehicle with a monocular image acquiring device, said device located on the automated vehicle at a predefined height above a plane of a road on which the automated vehicle travels. The method also includes capturing images of an environment proximate to the vehicle, wherein the images of the environment are taken at time intervals by the device. The method also includes classifying, by an image processing system, an object in the images. The method also includes associating, by the image processing system, the object with an object-class. The method also includes determining, by the image processing system, respective position data from the images using a pinhole camera model and based on the object-class. The position data indicative of a position of a reference point of the object with respect to the plane of the road in world coordinates. The method also includes estimating a scaling factor of the pinhole camera model using a Bayes estimator on the position data as observations and under the assumption that the reference point of the object is located on the plane of the road with a predefined probability. The method also includes calculating a distance of the object from the automated vehicle based on the scaling factor using the pinhole camera model.

A method in accordance with one embodiment provides that respective position data are determined from taken images using a pinhole camera model and based on the object-class. Position data indicating the position of a reference point of an object with respect to the plane of the road in world coordinates is analyzed. A scaling factor of the pinhole camera is estimated by means of a Bayes estimator using the position data as observations and under the assumption that the reference point of the object is located on the plane of the road with a predefined probability. The distance of the object from the automated vehicle is calculated from the estimated scaling factor using the pinhole camera model.

Pinhole camera models are generally known in the technical field and are used, for example, in tracking processes for converting between image coordinates and world coordinates. A pinhole camera model is completely determined by fixing a projection center or origin and an image plane. The projection of a world point or scene point into the image plane is described in this respect by multiplication of a projection matrix by the corresponding world coordinate vector. Due to the imaging of a three-dimensional world onto a two-dimensional image plane, the world coordinates belonging to a specific picture element cannot be indicated unambiguously, but rather only under the proviso of an unknown constant factor. This factor is called a scaling factor. It has been recognized in that an estimate of this scaling factor by means of a Bayes estimator can be used in an efficient manner a distance to the object. The determination of the absolute distance of an object from the automated vehicle using the estimated scaling factor is namely possible by a corresponding transformation of the projection equation of the pinhole camera model.

In the estimate of the scaling factor, the recognition of the object is used as a priori information that specific objects such as pedestrians or vehicles are always on the ground and that a reference point of such objects at the ground side is always in the plane of the road. This a priori information can, however, generally not be used as a highly valid assumption since it would be compromised too frequently and too greatly by unavoidable errors caused by, for example, pitching of the image capturing device. The position deviations of the objects with respect to the plane of the road may therefore be determined using the pinhole camera model and are used as observations of a Bayes estimator. The scaling factor of the pinhole camera model is used as the parameter to be estimated, that is which a posteriori distribution of the scaling factor best matches the observation data is determined by means of the Bayes estimator. A positional measure of the determined a posteriori distribution can then be used as the actual estimated value.

It has been found that the estimate of the scaling factor by means of a Bayes estimator is particularly robust and reliable, so consequently produces particularly exact results of distance determination. The estimated scaling factor is not limited to only being used for determining the object distance, but is advantageously also directly used for a separate tracking of the respective object using, for example, a Kalman filter.

The assumption is preferably used as the basis for the Bayes estimator that the width of the object associated with an object-class adopts one of at least one standard value associated with at the object-class with a predefined probability. This takes the circumstance into account that common image processing systems can carry out relatively reliable classifications and that there is thus comparatively firm prior knowledge with respect to the actual width of an object recognized in the image. In other words, the width of a successfully recognized and classified object can generally be restricted to a relatively narrow range. The Bayes estimator is used in this embodiment to fuse together different and mutually independent sources of a priori information, namely a localization of road users on the plane of the road, on the one hand, and a specification of standard widths for classified objects, on the other hand. The robustness of the estimate can be substantially increased by such a fusion.

A further embodiment of the invention provides that the assumption that the reference point of the object is located on the plane of the road with a predefined probability is modeled by a continuous a priori distribution, whereas the assumption that the width of the object adopts a standard value with a predefined probability is modeled by a discrete a priori distribution. It has been found that the object width can be indicated sufficiently exactly by a finite set of standard values. The Bayes estimator makes the fusion of continuous and discrete a priori information possible in an advantageous manner.

Results of a time filtering of the position data are preferably used as observations for the Bayes estimator, in particular wherein mean time values over a respective plurality of successively taken images are formed for the position indications. Interference influences such as pitching of the camera can be compensated by the time averaging, whereby the reliability of the estimating process is considerably increased. The arithmetic mean, the median, or a similar value can be selected as the mean value depending on the application.

The scaling factor of the pinhole camera can be estimated by determining the modal value of the a posteriori distribution of the observations. In other words, the maximum position of the density function of the a posteriori distribution is preferably used as the estimated value for the scaling factor. This produces a particularly reliable estimate. The expected value, the median, or another positional measure could generally also be used as the estimated value.

That respective angle of inclination is preferably used as the position indication which a view ray adopts with respect to the plane of the road, said view ray leading from the vehicle center of the automated vehicle projected perpendicular onto the plane of the road or from a fixed point arranged at a known distance therefrom to the reference point of the object. This angle of inclination can be derived in a simple manner from the world coordinates and from the projection matrix of the pinhole camera and is a measure for the deviation of the position of the object with respect to a localization on the plane of the road.

A normal distribution can in particular be fixed around the value zero as an a priori distribution of the angle of inclination. This is a favorable determination in that the deviation of the angle of inclination from the value zero is based on a number of mutually independent errors.

Provision can be made that the movement of the object is tracked by means of a tracking process which uses a recursive state switch, in particular a Kalman filter, and that the estimated scaling factor is used as an input for the recursive state switch. The estimated scaling factor in this manner so-to-say satisfies a double function in that it serves for the determining of the object distance, on the one hand, and for the tracking of the object by means of tracking, on the other hand.

The object can be associated with one of several object-classes by means of a classifier, wherein a separate width range and/or a separate set of discrete width values is/are defined for each object-class for fixing the a priori distribution of the width of the object. Common classifiers are, for example, able to distinguish reliably between pedestrians, bicycles, motorcycles, passenger cars, pick-up trucks (vans) and trucks. Each of these object-classes is generally characterized by a tightly limited width range so that the a priori distribution can be fixed with sufficient reliability by a width range or by a set of discrete width values for each object-class.

In accordance with a specific embodiment of the invention, the object is associated with one of the object-classes "four-wheeled vehicle" and "two-wheeled vehicle" by means of the classifier, wherein, preferably, an object associated with the object-class "four-wheeled vehicle" is associated with one of the subclasses "passenger vehicle", "van" and "truck". Such a hierarchical classification allows the taking into account of all common road users who may be in danger from the automated vehicle. Such road users are also called "vulnerable road users" or "VRUs". If required, the classifier can also take account of "bicycles" and "motorcycles" as subclasses of the object-class "two-wheeled vehicles" and/or of an object-class "pedestrians". A separate treatment of the object-classes "four-wheeled vehicles" and "two-wheeled vehicles", whose width ranges typically do not overlap, allows the saving of computing steps and is consistent with the module classification of common classifiers.

A further embodiment of the invention provides that a basic truth of the classifier is used for solving the equations of the Bayes estimator. The basic truth can e.g. represent that number of vehicles which are to be expected at all per object-class or object subclass. Basic truth classes can in particular be used which represent the actual object-classes in the world delineated from the observed object-classes output by the classifier. Such basic truth classes are frequently present as elements of a class confusion matrix.

Provision can be made that a smallest enclosing rectangle is determined for an object and in particular for every object, with a base located at the lower margin of the smallest enclosing rectangle being selected as the reference point of the object. Such smallest enclosing rectangles, so-called "bounding boxes", are defined for the objects in many tracking applications. The above-named base is preferably located at the center of the lower margin of the associated bounding box. At a base of an object recognized as a road user, the assumption is justified that it is located in the plane of the road with high probability.

Also described herein an apparatus or system for recognizing and tracking an object from a vehicle using a monocular image capturing device which is arranged at the automated vehicle at a predefined height above the plane of the road, and which is configured for taking images of the vehicle environment at time intervals and having an image processing system which is configured for carrying out a method as described above. The image processing system can in particular be computer-assisted.

Also described herein a computer program product which contains program instructions which execute a method of the above-described kind when the computer program is run on a computer.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which:

FIG. 3 is a diagram which shows a diagram of a method for determining the distance of an object from an automated vehicle in accordance with one embodiment.

DETAILED DESCRIPTION

Figure 1:
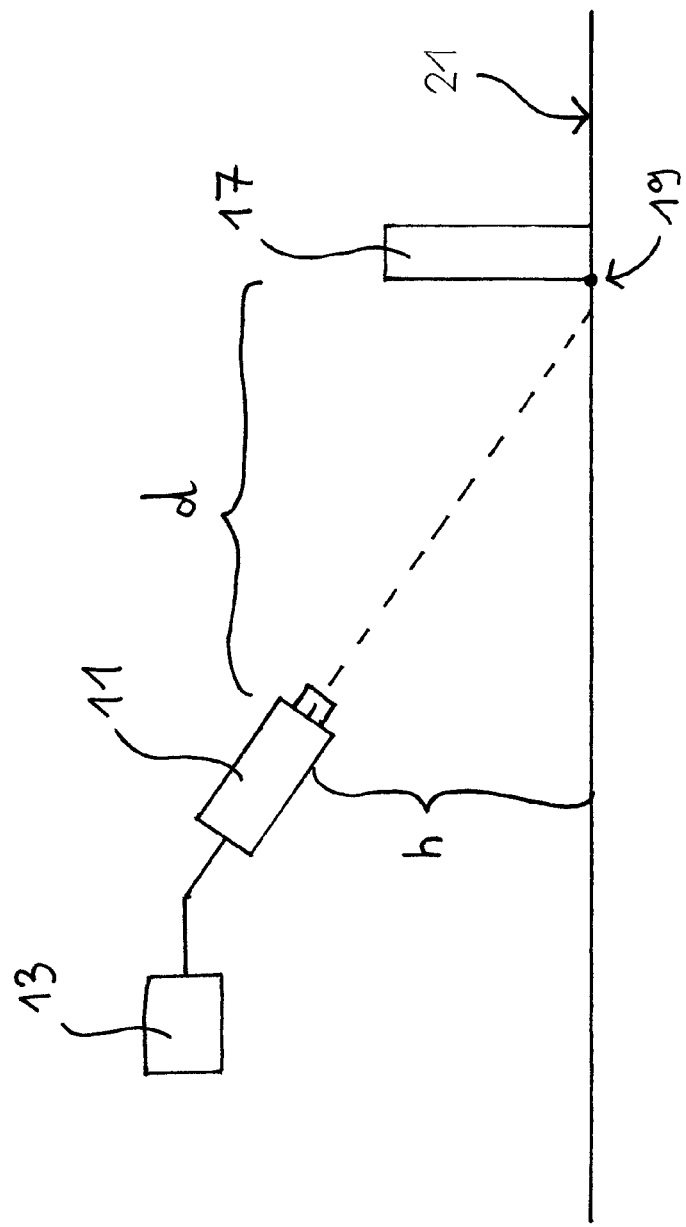
FIG. 1 is a schematic representation of an apparatus for recognizing and tracking an object from a automated vehicle in accordance with one embodiment.

FIG. 1 illustrates a non-limiting example of an apparatus that includes a monocular image capturing device 11, hereafter referred to as the device 11, which may be, for example, a digital camera. The apparatus also includes an image processing system 13, preferably a computer-assisted image processing system, associated with or in communication with the image capturing device 11. The device 11 is advantageously mounted on an automated vehicle (not shown) at a predefined or known value of height h above the plane of a road 21. The device 11 is configured to take or capture images of the environment or area about the vehicle at regular time intervals. The image processing system 13 may be configured to classify and/or track objects 17 of interest in the captured images, objects such as pedestrians, other vehicles, road signs, and the like using the images received/output by the device 11. Only one object 17 is shown in FIG. 1 in schematic form for reasons of simplicity. The image processing system 13 for the object recognition, object-classification, and object tracking preferably works with at least one classifier and at least one recursive state estimator, such as is generally known.

Figure 2:
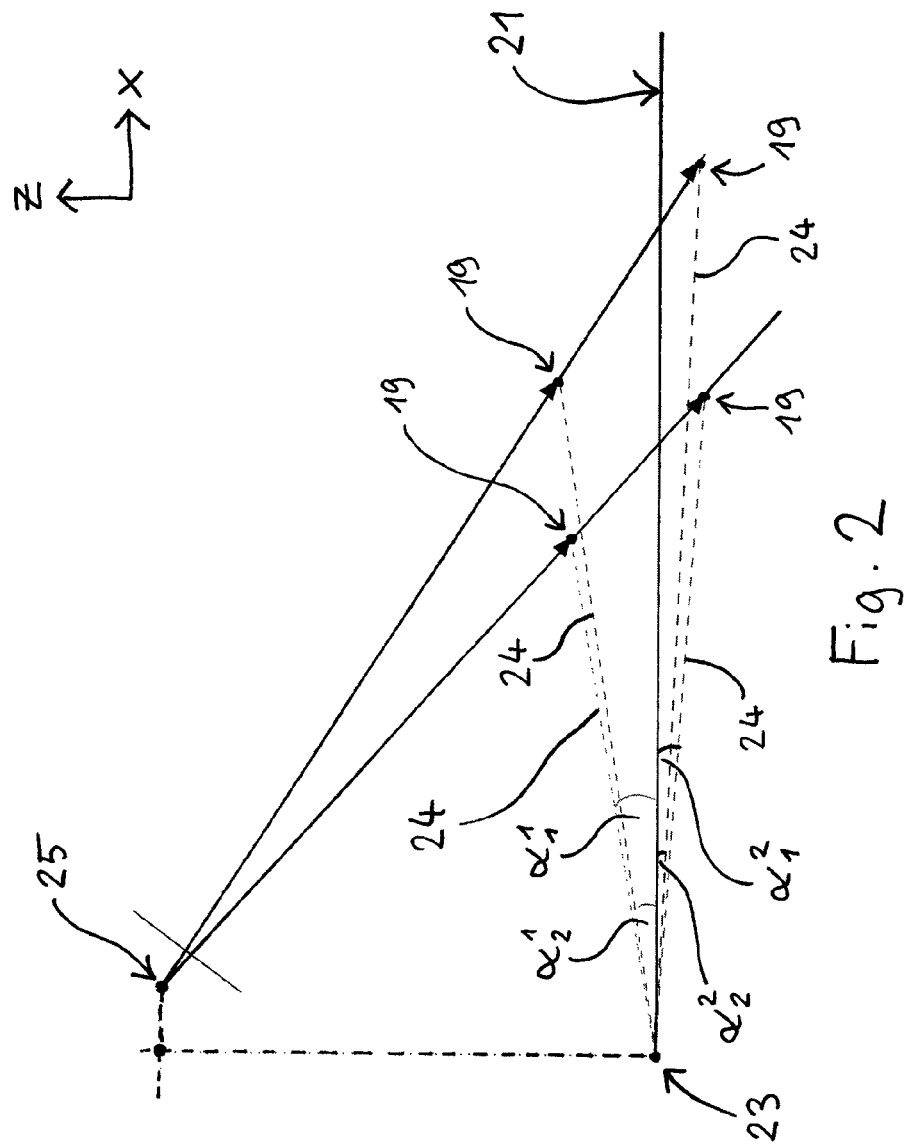
FIG. 2 shows, using a pinhole camera model, the relationship between the angle of inclination of an object point with respect to the plane of the road and the scaling factor of the pinhole camera model in accordance with one embodiment.

In order to determine a distance d from the automated vehicle to the object 17 using only the device 11, the object is first recognized in a typical manner by means of the image processing system 13 and is associated with an object-class. Within the framework of this process, a smallest enclosing rectangle or so-called "bounding box" is determined and a base 19 of the object 17 located at the lower margin of the smallest enclosing rectangle at the center is defined as the reference point for the further processing steps. The device 11 is then mathematically modeled by a pinhole camera model which is illustrated in FIG. 2.

The relationship between the world coordinates $x_w$, $y_w$, $z_w$ of a specific scene point and the associated image coordinates $x_i$, $y_i$, $z_i$ is given by Eq. 1 in the pinhole camera model:

$$\begin{pmatrix} x_i \\ y_i \\ z_i \\ 1 \end{pmatrix} = C \cdot \begin{pmatrix} x_w \\ y_w \\ z_w \\ 1 \end{pmatrix}, \quad \text{Eq. 1}$$

where C designates a transformation matrix of the pinhole camera model. The position (ix, iy) of the imaged point within the image plane can then be calculated as follows:

$$i_x = \frac{x_i}{z_i} = \frac{sx_i}{sz_i}$$

$$i_y = \frac{y_i}{z_i} = \frac{sy_i}{sz_i}.$$

This position within the image plane is the same for every s≠0. That is every multiplication of the image coordinate vector by a factor s produces the same picture elements. Eq. 1 can be rewritten as shown in Eq. 2 by assuming p=1/s are the same and using auxiliary coordinates $x_w'$, $y_w'$, $z_w'$, $\tilde{x}_w$, $\tilde{y}_w$, $\tilde{z}_w$:

$$s \cdot C_{3\times3}^{-1} \begin{pmatrix} x_i \\ y_i \\ z_i \end{pmatrix} + C_4^{-1} = \begin{pmatrix} x_w' \\ y_w' \\ z_w' \end{pmatrix} \Leftrightarrow \frac{1}{p} \cdot \begin{pmatrix} \tilde{x}_w \\ \tilde{y}_w \\ \tilde{z}_w \end{pmatrix} + C_4^{-1} = \begin{pmatrix} x_w' \\ y_w' \\ z_w' \end{pmatrix}, \quad \text{Eq. 2}$$

where $C^{-1}$ designates the inverse of the transformation matrix. The unknown factor p is called the "scaling factor".

In a method in accordance with the invention, this scaling factor p of the pinhole camera model is estimated using a Bayes estimator, where the assumption is used as prior knowledge that the base 19 of an object 17 recognized as a "road user" is normally located in the plane of the road 21.

p is therefore the sought parameter in the estimation using the Bayes estimator. p=W/WR, now applies, where W is an object width constant which is normally used for tracking the object 17 by means of tracking and which is provided by a corresponding tracker and where WR is the unknown actual width of the object 17. A finite set of possible object widths WR, and thus of possible scaling factors p is now defined on the basis of the different object-classes predefined by the classifier in order to take the circumstance into account that there are frequently width values which are impossible for a specific object 17. For example, a distinction can be made between motorized two-wheeled vehicles, on the one hand, and four-wheeled vehicles, on the other hand, with the four-wheeled vehicles being treated separately from the two-wheeled vehicles.

$$\theta = \begin{cases} \left\{ \frac{W}{W_{min}^{vehicle}}, \ldots, \frac{W}{W_{max}^{vehicle}} \right\}, & Vehicletype = \text{Four-}wheeledvehicle \\ \left\{ \frac{W}{W_{min}^{bike}}, \ldots, \frac{W}{W_{max}^{bike}} \right\}, & Vehicletype = \text{Two-}wheeledvehicle \end{cases} \quad 5$$

This produces a finite set of hypotheses for the currently matching scaling factor p which is characterized by the index i. The angle of inclination $\alpha_i^t$ between the base 19 and the plane of the road 21 can be given by Eq. 3 at the time t for each of these hypotheses $p_i$:

$$\alpha_t^i = \arctan\left(\frac{\frac{x_w^t}{p_i} + C_{14}}{\frac{z_w^t}{p_i} + C_{34}}\right) \quad \text{Eq. 3}$$

In this respect, in accordance with FIG. 2, it is that angle which a view ray 24 adopts with respect to the plane of the road 21, said view ray leading from the origin 23 of the plane of the road 21 to the base 19 of the object 17. The origin 23 of the plane of the road 21 is produced by a perpendicular projection of the vehicle center, not shown, onto the plane of the road 21. It is located behind the origin 25 of the pinhole camera model with respect to the direction of travel.

A direct estimate of the scaling factor p by means of a Bayes estimator with an observed angle a is not reliable enough to be used in a driver assistance system due to various interference influences such as unpredictable pitching of the device 11. A mean value such as the arithmetic mean of a plurality of such angle observations is therefore used to compensate the interference. The following observation is specifically defined:

$$\overline{\alpha}_i := \text{mean}(A_i) \in \Phi, \Phi = \left]-\frac{\pi}{2}, \ldots \frac{\pi}{2}\right[, A_i = \{\alpha_i^t \mid t = 1, \ldots, n\}.$$

where it is expected of the angle a that it has a normal distribution about the plane of the road 21.

C:={CAR,VAN,TRUCK} ∪ {BIKES} can be defined as the finite set of object-classes, where CAR stands for passenger vehicles, VAN for vans, TRUCK for trucks and BIKES for motorcycles and optionally bicycles. A Bayes estimator is then obtained which combines the above-described angle observation with the object-classes $c_c \in C$ using the basic truth classes $c_{gt} \in C$:

$$P(p_i \mid \overline{\alpha}_i, c_c) = \frac{P(\overline{\alpha}_i, c_c \mid p_i)P(p_i)}{\sum_{p_i' \in \theta} P(\overline{\alpha}_i, c_c \mid p_i')} \stackrel{def}{=} \frac{P(\overline{\alpha}_i \mid p_i)P(c_c \mid p_i)\frac{1}{|\theta|}}{\frac{1}{|\theta|}\sum_{p_i' \in \theta} P(\overline{\alpha}_i, c_c \mid p_i')}$$

$$= \frac{P(\overline{\alpha}_i \mid p_i)P(c_c \mid p_i)}{\sum_{p_i' \in \theta} P(\overline{\alpha}_i, c_c \mid p_i')}.$$

Here, $P(p_i | \overline{\alpha}_i, c_c)$ designates the distribution of the parameter p to be estimated in dependence on the observed angles a and vehicle classes $c_c$. The following relationship can be given using the basic truth classes $c_{gt}$ k:

$$P(c_c \mid p_i) = \sum_{c_{gt}} P(c_c, c_{gt} \mid p_i)$$

$$= \sum_{c_{gt}} P(c_c \mid c_{gt}, p_i) P(c_{gt} \mid p_i)$$

$$= \sum_{c_{gt}} P(c_c \mid c_{gt}) P(c_{gt} \mid p_i)$$

$$= \frac{\sum_{c_{gt}} p(c_c \mid c_{gt}) P(p_i \mid c_{gt}) p(c_{gt})}{\sum_{c_{gt}'} P(p_i \mid c_{gt}') p(c_{gt}')}.$$

When assembling the formulas for the Bayes estimator, it was implicitly assumed that the different scaling factors $p_i$, are evenly distributed within the finite set of possible values. It is understood that this assumption is arbitrary and that the estimation process can be improved as required by taking account of additional a priori knowledge.

The scaling factor p can now be estimated with the aid of the above-given formulas using a maximum a posteriori process—here by determining the modal value of the a posteriori distribution of the observations (Eq. 4):

$$p = \underset{p_i}{\text{argmax}}(P(p_i \mid \overline{\alpha}_i, c_c)) \quad \text{(Eq. 4)}$$

$$= \text{argmax}_{p_i}\left(\frac{P(\overline{\alpha}_i \mid p_i)\sum_{c_{gt}} P(c_c \mid c_{gt})P(p_i \mid c_{gt})P(c_{gt})}{\sum_{p_i' \in \theta} P(\overline{\alpha}_i, c_c \mid p_i')\sum_{c_{gt}'} P(p_i \mid c_{gt}')P(c_{gt}')}\right)$$

$$= \text{argmax}_{p_i} \frac{P(\overline{\alpha}_i \mid p_i)\sum_{c_{gt}} P(c_c \mid c_{gt})P(p_i \mid c_{gt})P(c_{gt})}{\sum_{c_{gt}'} P(p_i \mid c_{gt}')P(c_{gt}')}$$

Provided it is ensured that $P(c_c|c_{gt}) \neq 0$, $P(p_i|c_{gt}) \neq 0$ and $P(c_{gt}) \neq 0$ for at least one $c_{gt} \in C$, a logarithmic version of formula (4) can be used (Eq. 5):

$$p = \underset{p_i}{\text{argmax}}(P(p_i \mid \overline{\alpha}_i, c_c)) \quad \text{(Eq. 5)}$$

$$= \underset{p_i}{\text{argmax}}\left(\ln(P(\overline{\alpha}_i \mid p_i)) + \ln\left(\sum_{c_{gt}} P(c_c \mid c_{gt})P(p_i \mid c_{gt})P(c_{gt})\right) - \ln\left(\sum_{c_{gt}'} P(p_i \mid c_{gt}')P(c_{gt}')\right)\right),$$

where $P(\overline{\alpha}_i|p_i)$ is calculated in each time step using Eq. 3. The last two summands of the logarithmic formula of Eq. 5 can be calculated before the start of the process and can be stored in a look-up table since they do not depend on the time.

$P(c_c|c_{gt})$ is derived from the class confusion matrix of the classifier and $P(c_c|c_{gt})$ is the a priori probability for a specific object-class. $P(p_i|c_{gt})$ is selected in the following manner, for example:

$$P(p_i \mid c_{gt}) = \begin{cases} \dfrac{1}{\left|\left\{p_i' \mid \dfrac{W}{p_i'} \in I_{c_{gt}},\, p_i' \in \theta\right\}\right|}, & \dfrac{W}{p_i} \in I_{c_{gt}} \\ 0, & \text{other} \end{cases},$$

where $I_{c_{gt}}$ respectively contains the object widths which are possible for the respective vehicle types (CAR, VAN, TRUCK or BIKE). Instead of an even distribution in the corresponding interval, a different distribution could also be used for each basic truth class cgt.

After the estimation of the scaling factor p, the distance d of the object 17 of the vehicle can be calculated as follows:

$$d = \left\| \dfrac{1}{p} \cdot \begin{pmatrix} \tilde{x}_w \\ \tilde{y}_w \\ \tilde{z}_w \end{pmatrix} + C_4^{-1} \right\|_2.$$

In addition, the estimated scaling factor p is used as the input for that recursive state estimator which serves for tracking the movement of the object 17 by means of a tracking process. It can in particular be a Kalman filter in this respect.

A particularly robust estimate of the scaling factor and consequently a particularly reliable determination of the object distance is possible due to the fusion of the prior knowledge present in various form by means of the specific Bayes estimator, as is illustrated in FIG. 3.

While this invention has been described in terms of the preferred embodiments thereof, it is not intended to be so limited, but rather only to the extent set forth in the claims that follow.

We claim:

1. A method of determining the distance of an object from an automated vehicle, said method comprising:
    equipping an automated vehicle with a monocular image acquiring device, said device located on the automated vehicle at a predefined height above a plane of a road on which the automated vehicle travels;
    capturing images of an environment proximate to the vehicle, wherein the images of the environment are taken at time intervals by the device;
    classifying, by an image processing system, an object in the images;
    associating, by the image processing system, the object with an object-class;
    determining, by the image processing system, respective position data from the images using a pinhole camera model and based on the object-class, said position data indicative of a position of a reference point of the object with respect to the plane of the road in world coordinates;
    estimating a scaling factor of the pinhole camera model using a Bayes estimator on the position data as observations and under the assumption that the reference point of the object is located on the plane of the road with a predefined probability; and
    calculating a distance of the object from the automated vehicle based on the scaling factor using the pinhole camera model, wherein an angle of inclination is used as the position indication that a view ray adopts with respect to the plane of the road, said view ray leading from a center of the automated vehicle and projected perpendicular onto the plane of the road and from a fixed point arranged at a known distance therefrom to the reference point of the object.

2. A method in accordance with claim 1, wherein a further assumption is used as the basis for the Bayes estimator in that a width of the object is associated with the object-class and adopts a standard value associated with of the object-class with a predefined probability.

3. A method in accordance with claim 2, wherein the assumption that the reference point of the object is located on the plane of the road with a predefined probability is modeled by a continuous a priori distribution, whereas the assumption that the width of the object adopts a standard value with a predefined probability is modeled by a discrete a priori distribution.

4. A method in accordance with claim 1, wherein results of a time filtering of the position data are used as observations for the Bayes estimator, wherein mean time values over a respective plurality of successively taken images are formed for the position data.

5. A method in accordance with claim 1, wherein the scaling factor (p) of the pinhole camera is estimated by determining a modal value of a posteriori distribution of the observations.

6. A method in accordance with claim 1, wherein a normal distribution can be fixed around the value zero as an a priori distribution of the angle of inclination.

7. A method in accordance with claim 1, wherein movement of the object is tracked by a tracking process that uses a recursive state switch characterized by a Kalman filter, and that the estimated scaling factor is used as an input for the recursive state switch.

8. A method in accordance with claim 1, wherein the object is associated with one of a plurality of object-classes by a classifier, wherein a separate width range and a separate set of discrete width values are defined for each object-class for fixing the a priori distribution of the width of the object.

9. A method in accordance with claim 8, wherein the object is associated with one of the object-classes "four-wheeled vehicle" and "two-wheeled vehicle" by the classifier, wherein, an object associated with the object-class "four-wheeled vehicle" is associated with one of the sub-classes "passenger vehicle", "van" and "truck".

10. A method in accordance with claim 8, wherein a basic truth of the classifier is used for solving the equations of the Bayes estimator.

11. A method in accordance with claim 1, wherein a smallest enclosing rectangle is determined for the object with a base located at the lower margin of the smallest enclosing rectangle being selected as the reference point of the object.

* * * * *